May 5, 1942. H. TUNICK 2,282,104
RECEPTION OF ANGULAR VELOCITY MODULATED WAVES
Original Filed Dec. 22, 1939 3 Sheets-Sheet 1
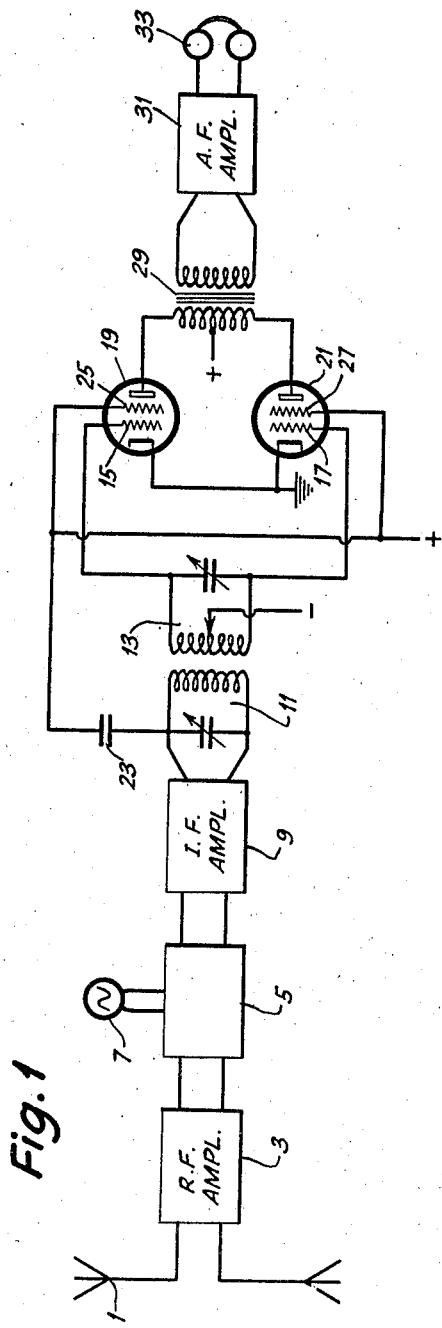
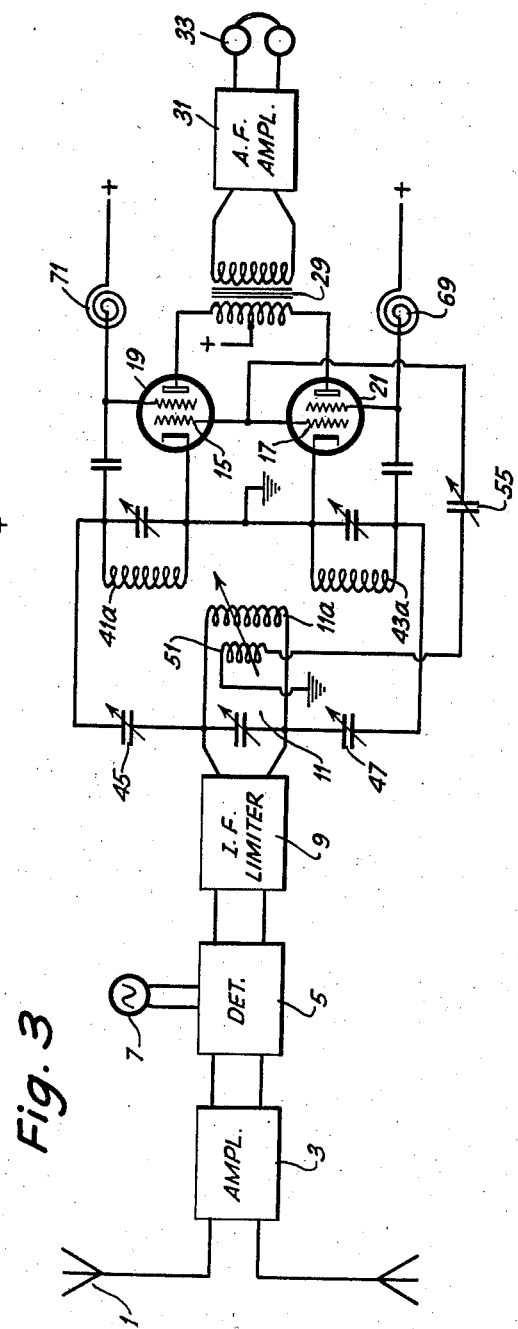
INVENTOR
*HARRY TUNICK*
BY
ATTORNEY

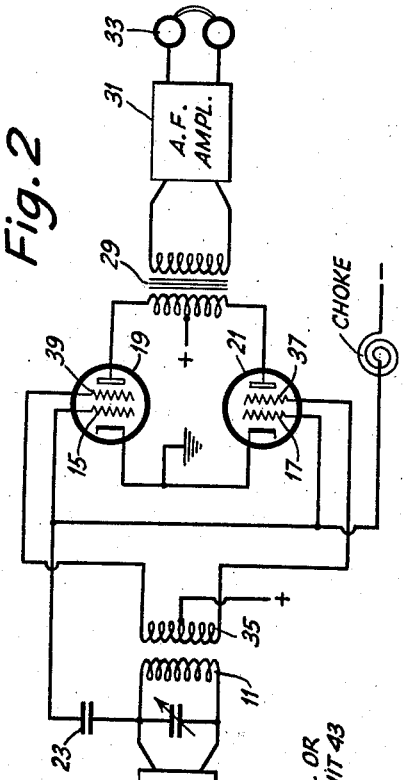
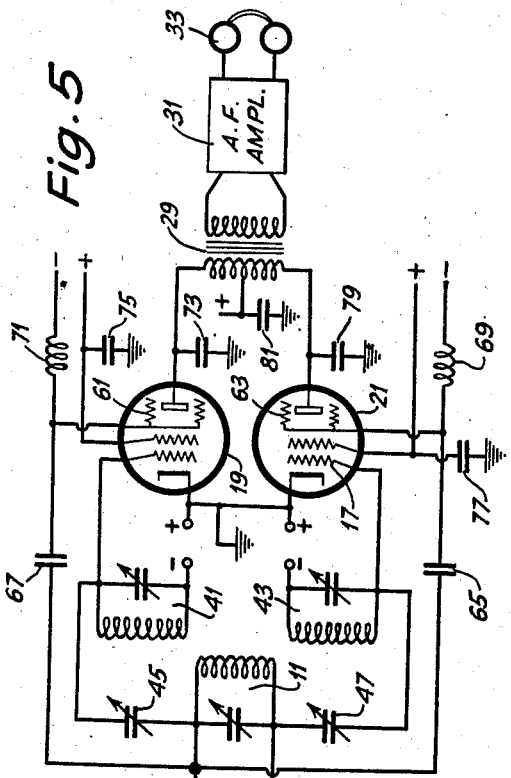
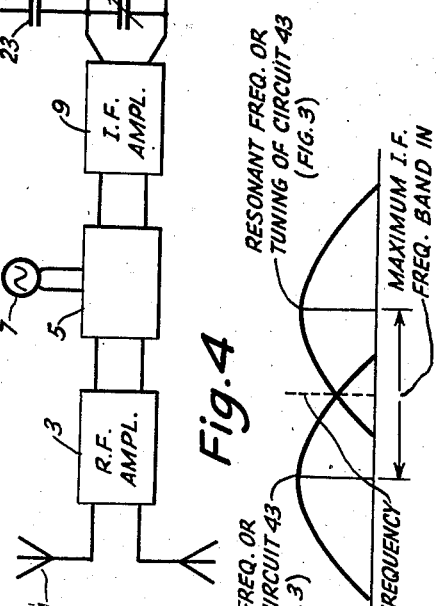

May 5, 1942.   H. TUNICK   2,282,104
RECEPTION OF ANGULAR VELOCITY MODULATED WAVES
Original Filed Dec. 22, 1939   3 Sheets-Sheet 3

INVENTOR
HARRY TUNICK
BY  H.S.Grover
ATTORNEY

Patented May 5, 1942

2,282,104

UNITED STATES PATENT OFFICE 2,282,104

RECEPTION OF ANGULAR VELOCITY MODULATED WAVES

Harry Tunick, Rye, N. Y., assignor to Radio Corporation of America, a corporation of Delaware Application October 16, 1940, Serial No. 361,413, which in turn is a division of application Serial No. 310,495, December 22, 1939. Divided and this application November 29, 1941, Serial No. 420,954

3 Claims. (Cl. 250—27)

This is a division of my application Serial No. 361,413, filed October 16, 1940, in turn a division of my copending application Serial No. 310,495, filed December 22, 1939. Figures 1 to 7 inclusive herein correspond, respectively, to original Figures 11, 12, 13, 13a, 14, 20 and 21 of my parent application Serial No. 310,495 and, respectively, to Figures 2, 3, 4, 5, 6, 12 and 13 of my application Serial No. 361,413.

The main object of my present invention is to provide improved circuits for detecting frequency modulated waves. Other objects, as well as advantages, of my invention will be apparent as the more detailed description thereof proceeds.

It is to be clearly understood that the apparatus described herein may be employed for the reception of any type of angular velocity modulated waves such as phase modulated waves. In this event, however, the modulation amplifying circuits following the detector should be modified so that, for example, if phase modulated waves are received, the amplifying circuits should be modified so as to have a characteristic such that amplification falls off with increase in modulation frequency.

Figure 6:
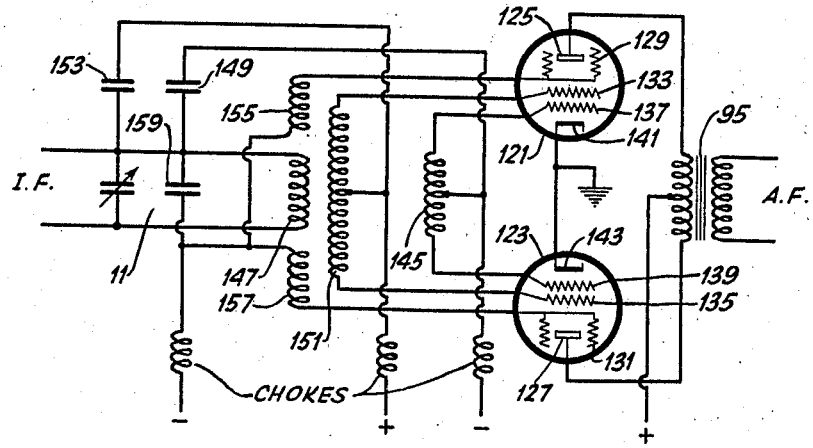
Figure 7:
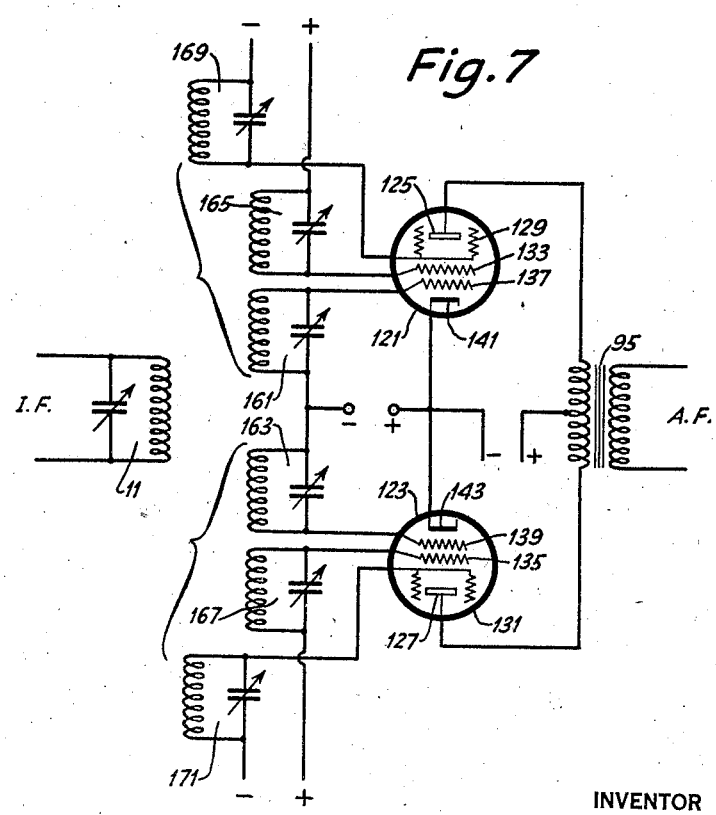

Figures 1, 2, 3 and 5 are schematic diagrams of radio receivers for receiving, demodulating and translating angular velocity modulated waves, it being noted that the receivers have different discriminators each employing principles and features of my present invention. Figure 4 is a curve explanatory of adjustments made in the discriminator in, for example, Figure 3; and Figures 6 and 7 are schematic wiring diagrams of alternative forms of discriminator circuits employing features and principles of my present invention.

In the frequency modulation receiver of Figure 1, frequency modulated waves picked up on antenna 1 are amplified by radio frequency amplifier 3 and combined in first detector 5 with waves from the local generator 7. The beat or intermediate frequency energy resulting from this combination in first detector 5 is amplified in an intermediate frequency amplifier 9 and then fed through tuned circuits 11, 13 in push-pull to the grids 15, 17 of balanced detector tubes 19, 21. Another portion of the intermediate frequency wave energy is fed through condenser 23 in push-push to the screen grids 25, 27, which are connected in parallel, of detector tubes 19, 21. The resultant audio frequency or signal output is fed through transformer 29, amplified by signal or audio amplifier 31 and then translated into sound by earphones or loudspeaker 33.

In the frequency modulation radio receiver of Figure 2, intermediate frequency energy appearing in tuned circuit 11 is inductively fed into coil 35, thereby exciting the screen grids 37, 39 in phase opposition. The control grids 15, 17 are connected in parallel and are excited cophasally from tuned circuit 11 by connection thereto through condenser 23 which passes all of the frequencies of intermediate frequency energy, as does also the coupling between circuit 11 and coil 35. The audio frequency or signal output of tubes 19, 21 are combined in phase opposition in the primary of transformer 29 and then fed to amplifier 31. The output of amplifier 31 is fed to translating device 33, here shown as earphones.

In the receiver of Figure 3, intermediate frequency energy from intermediate frequency circuit 11 is inductively injected into tuned circuits 41, 43. If desired, the coupling between the coil 11a of circuit 11 and the coils 41a and 43a of circuits 41 and 43 may be eliminated, in which case energy may be transferred from circuit 11 into circuits 41, 43 by condensers 45, 47. Or, if desired, circuit 11 may be both inductively and capacitively coupled to circuits 41 and 43.

As illustrated in Figure 4, circuit 41 is tuned to or beyond one extreme of the intermediate frequency band of frequencies and circuit 43 is tuned to or beyond the opposite extreme frequency of the intermediate band of frequency modulated waves appearing in circuit 11. Detectors 19, 21 will produce in transformer 29 the original audio frequency waves or signaling waves transmitted. The latter, as before, may be amplified in the signal or audio amplifier 31 and translated by device 33.

As an additional feature, part of the intermediate frequency wave energy from circuit 11 may be inductively fed through coil 51 coupled to coil 11a and lead 53 in push-push to the parallelly connected grids 15, 17 of push-pull connected rectifier tubes 19, 21. Variable condenser 55 may be provided, as shown, for adjusting the phase of the energy fed in push-push to the grids 15, 17.

In the receiver of Figure 5, circuits 11, 41 and 43 are adjusted and coupled as described in connection with Figure 4. Also, if desired, the additional or alternative coupling through condensers 45 and 47 may be provided. It is to be noted, however, in Figure 5 that circuits 41 and 43 are connected to the control grids 15, 17 rather than to the screen grids of tubes 19, 21.

As so far described, the receiver of Figure 5 will operate to produce signals in the push-pull connected plate circuit of tubes 19 and 21 which may be fed through transformer 29 to amplifier 31 for translation in device 33. If desired, the suppressor grids 61, 63 may be connected in parallel to one side of circuit 11, as shown, through large by-passing condensers 65, 67. In this way, the suppressor grids 61, 63 are excited cophasally with intermediate frequency energy from intermediate frequency amplifier 9. For obvious reasons, choke coils 69, 71 and by-passing condensers 73, 75, 77, 79 and 81 are provided.

All of the frequency modulation receivers described herein may be used to receive phase modulated waves, it being understood that, preferably, an additional correction circuit is added to the signal or audio frequency amplifier stages of the receiver. This additional correction should have a characteristic such that the amplifier output falls off with increase in frequency. The preferred correction circuit for the receivers described herein when used to receive phase modulated waves is described in Crosby Patent No. 2,060,611.

The receiver or detector circuit of Figure 6 is provided with an input circuit 11 described hereinbefore. The detector tubes 121, 123 are provided with anodes 125, 127, suppressor grids 129, 131, screen grids 133, 135, control grids 137, 139 and cathodes 141, 143. The control grids 137, 139 are connected in phase opposition by coil 145 coupled to coil 147 of circuit 11. Additional push-push excitation of control grids 137, 139 is provided by and through condenser 149.

Screen grids 133, 135 are connected in phase opposition by coil 151 coupled to coil 147. The screen grids may be additionally excited in push-push by condenser 153 if desired.

The suppressor grids 129, 131 are connected in phase opposition by coils 155, 157 also coupled to coil 147. Additional suppressor grid excitation in push-push may be provided by condenser 159 if desired. Grids 137, 133 and 129 are excited cophasally with successively higher voltages. They may, of course, be excited with the alternating voltage of the same amplitude or with successively decreasing voltages or with any related voltages, depending upon the closeness of coupling of coils 145, 151 and 155 with coil 147. Grids 139, 135 and 131 of detector tube 123 are similarly excited, it being noted that the inductive coupling makes the group of grids of tube 123 excited respectively out of phase with the corresponding group of grids of tube 121. The resultant audio signal frequency energy, as before, is combined in transformer 95 and utilized as found desirable.

In the receiving or detecting system of Figure 7, the intermediate frequency circuit 11 is inductively coupled to pairs of off-tuned circuits 161, 163; 165, 167 and 169, 171. The off-tuning of these circuits is as described in connection with Figures 3 and 4. The pair of circuits 161, 163 are connected to the grids 137, 139 of detector tubes 121, 123. The pair of off-tuned circuits 165, 167 are connected to the screen grids 133, 135; and, the pair of off-tuned circuits 169, 171 are connected to the suppressor grids 129, 131 of detector tubes 121, 123, the anodes 125, 127 of which are connected as shown to the primary of signal frequency output transformer 95.

By suitable adjustment of coupling between circuit 11 and circuits 161, 165 and 169, the grids 139, 133 and 129 of tube 121 are excited cophasally and may be excited in successively increasing amounts or the same amount or at different values of alternating voltage derived from input circuit 11. The grids of tube 123 are correspondingly excited. That is, the grids of tube 123 are similarly excited as to value and cophasally with respect to each other, but anti-phasally or in phase opposition with respect to the grids of the other detector 121.

In connection with Figures 6, although not so illustrated, coil 145 is preferably tuned to the mean frequency by means of a condenser in shunt therewith and also preferably coil 151 should be so tuned and coils 155 and 157 taken together should be so tuned.

Having thus described my invention, what 1 claim is:

1. In combination, a pair of electron discharge systems each having an anode, a cathode and a multiplicity of grids, a series of parallel tuned circuits tuned to one side of a desired operating frequency connected between electrodes of one of said systems, another series of parallel tuned circuits tuned to a frequency on the opposite side of said mean frequency connected to electrodes of the other of said systems, means for feeding frequency modulated waves to said parallel tuned circuits, and means for deriving from said electrodes of said systems demodulated frequency modulated waves.

2. In combination, a pair of electron discharge devices each having an anode and cathode and a plurality of control grids, a first frequency discriminating circuit connected to and between a pair of like control grids of said devices, a second frequency discriminating circuit connected to and between a second pair of like control grids of said devices, and a de-modulation output circuit connected to and between the anodes of said electron discharge devices.

3. In combination, a source of substantially constant amplitude frequency modulated waves, a pair of electron discharge systems each having an anode, a cathode and a plurality of grids, a first frequency to amplitude converting circuit arrangement connected between and to a pair of like grids of said systems, a second frequency to amplitude converting circuit arrangement connected between and to a second pair of like grids of said electron discharge systems, said converting circuit arrangements being fed with waves from said source of frequency modulated waves, and a de-modulation frequency circuit connected to and between the anodes of said electron discharge systems.

HARRY TUNICK.